United States Patent
Cooper

(10) Patent No.: US 9,868,351 B2
(45) Date of Patent: Jan. 16, 2018

(54) VEHICLE AXLE CONNECT AND DISCONNECT SYSTEM

(71) Applicant: Dana Automotive Systems Group, LLC, Maumee, OH (US)

(72) Inventor: Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/171,481

(22) Filed: Jun. 2, 2016

(65) Prior Publication Data

US 2017/0349044 A1    Dec. 7, 2017

(51) Int. Cl.
| | |
|---|---|
| *B60K 23/08* | (2006.01) |
| *B60K 17/16* | (2006.01) |
| *B60B 35/16* | (2006.01) |
| *F16D 28/00* | (2006.01) |
| *F16D 11/14* | (2006.01) |
| *F16D 23/12* | (2006.01) |

(52) U.S. Cl.
CPC .............. *B60K 23/08* (2013.01); *B60B 35/16* (2013.01); *B60K 17/16* (2013.01); *F16D 11/14* (2013.01); *F16D 28/00* (2013.01); *F16D 2023/123* (2013.01)

(58) Field of Classification Search
None
See application file for complete search history.

(56) References Cited

U.S. PATENT DOCUMENTS

| | | | |
|---|---|---|---|
| 1,589,701 A | 6/1926 | Infiorati, Jr. | |
| 2,353,471 A | 7/1944 | Johndrew | |
| 4,425,814 A | 1/1984 | Dick | |
| 4,498,350 A | 2/1985 | Ross | |
| 4,760,907 A | 8/1988 | Avny | |
| 5,460,060 A * | 10/1995 | Nellums | F16H 63/304 |
| | | | 192/109 A |
| 6,460,671 B1 | 10/2002 | Karambelas et al. | |
| 6,848,557 B2 | 2/2005 | Kapaan et al. | |
| 7,334,671 B2 | 2/2008 | Langwald | |
| 9,109,634 B2 * | 8/2015 | Tronnberg | F16D 28/00 |
| 2004/0050643 A1 | 3/2004 | Krzesicki et al. | |
| 2011/0290046 A1 * | 12/2011 | Gloge | F16D 11/10 |
| | | | 74/25 |

* cited by examiner

*Primary Examiner* — Mark A Manley
(74) *Attorney, Agent, or Firm* — Marshall & Melhorn, LLC

(57) ABSTRACT

An electronic self-locking connect and disconnect system for vehicles. The system includes a motor which turns a gear that meshes with a ring gear contained within a housing. The ring gear meshes with a lead screw thread on an outer surface of a lead screw. When the motor is activated the ring gear rotates the lead screw thread which selectively engages or disengages the clutch. A groove extends on the outer surface of and transverse to the lead screw thread. A pin extends radially inward from an inner surface of the housing till part of the pin is located within the groove. When the pin contacts a radial wall of the groove it prevents further rotation of the lead screw which prevents the stub shaft from axially moving beyond predetermined points. A spring and a sliding collar may be utilized to accommodate full motor travel regardless of the clutch state.

24 Claims, 7 Drawing Sheets

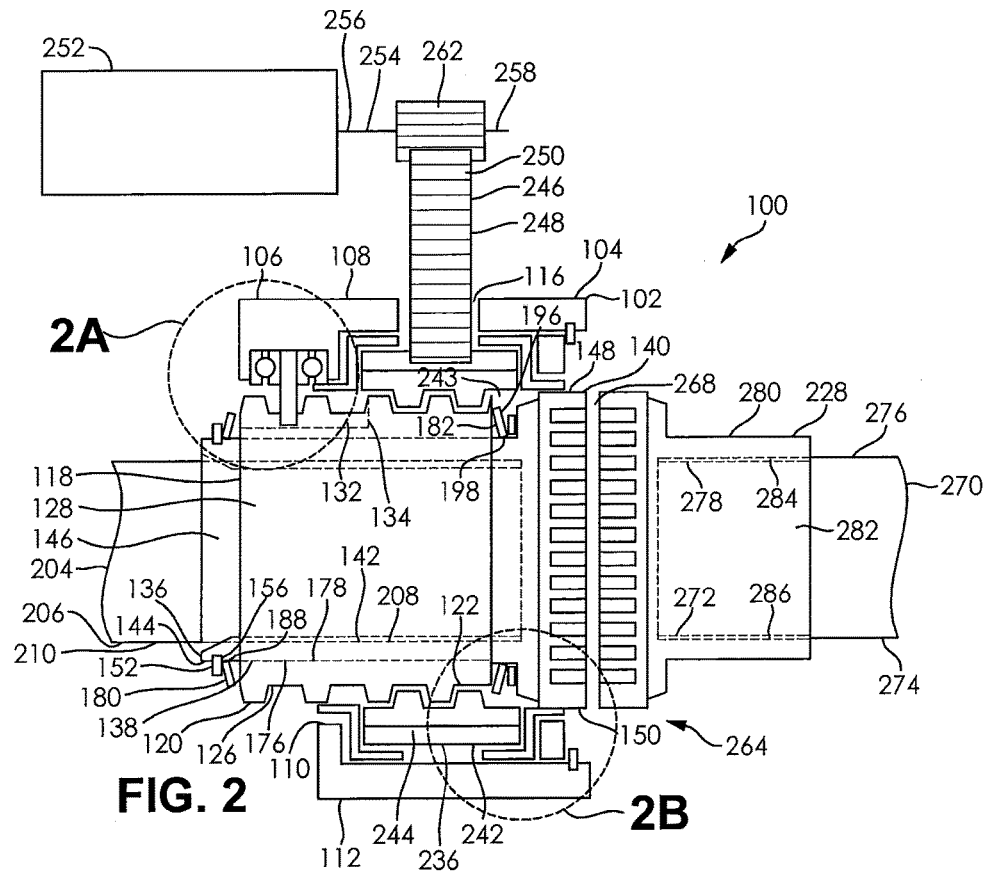
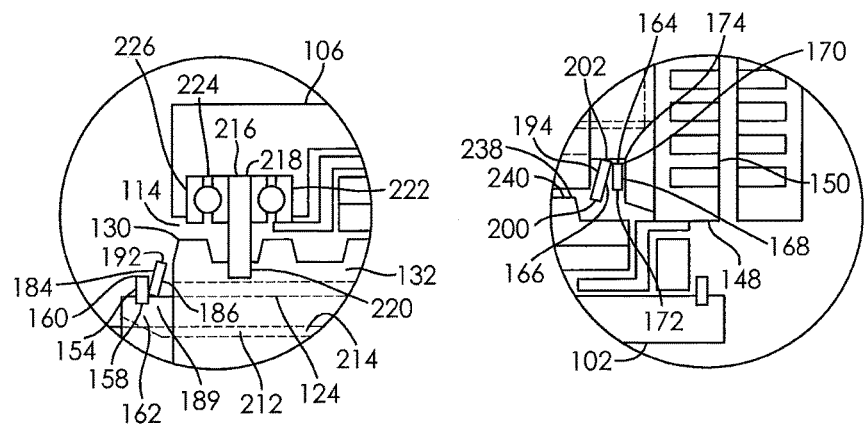
FIG. 2      FIG. 2A      FIG. 2B

VEHICLE AXLE CONNECT AND DISCONNECT SYSTEM

FIELD OF THE INVENTION

The present invention relates to a rapid connect and disconnect system for a vehicle.

BACKGROUND OF THE INVENTION

Systems for connecting and disconnecting an axle in a vehicle are known within the industry. These types of systems are often used to either connect one portion of a driveline to another or to disconnect one portion of a driveline from another. Many of these devices are large in size making it a challenge to fit them on the vehicle. Additionally, many of these devices lack the force necessary to sufficiently connect one portion of the driveline to the other. Often times this will result in a premature disconnection of the driveline. Additionally, many of these devices lack the ability to allow the motor to fully travel from a first position to a second position even when the clutch teeth are blocked.

It would be advantageous to create a simple system for connecting and disconnecting an axle in a vehicle that is more compact in size while still having sufficient locking force to ensure a secure engagement of one portion of the driveline to another. Additionally, it would be advantageous to create a system for connecting and disconnecting an axle in a vehicle that will allow for pre-engagement of the clutch even if the clutch teeth are blocked.

SUMMARY OF THE INVENTION

An electronic self-locking connect and disconnect system for a vehicle. The system includes a motor which turns a gear that meshes with a ring gear contained within a housing. The ring gear is meshed with a lead screw thread on an outer surface of a lead screw. When the motor is activated the ring gear rotates the lead screw thread which facilitates the selective engagement or disengagement of the clutch. A groove extends on the outer surface of and transverse to the lead screw thread. A pin extends radially inward from an inner surface of the housing so that at least a portion of the pin is located within the groove. When the pin contacts a radial wall of the groove it prevents further rotation of the lead screw which in turn prevents the axial movement of the stub shaft in either direction beyond predetermined points.

BRIEF DESCRIPTION OF THE DRAWINGS

The above, as well as other advantages of the present invention, will become readily apparent to those skilled in the art from the following detailed description when considered in light of the accompanying drawings in which:

FIG. 2 is a schematic cut-away side view of the vehicle connect and disconnect system in its first position according to a first embodiment of the invention;

FIG. 2A is a schematic cut-away detail view of the vehicle connect and disconnect system from section A in FIG. 2;

FIG. 2B is a schematic cut-away detail view of the vehicle connect and disconnect system from section B in FIG. 2;

DETAILED DESCRIPTION OF THE INVENTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

Figure 1:
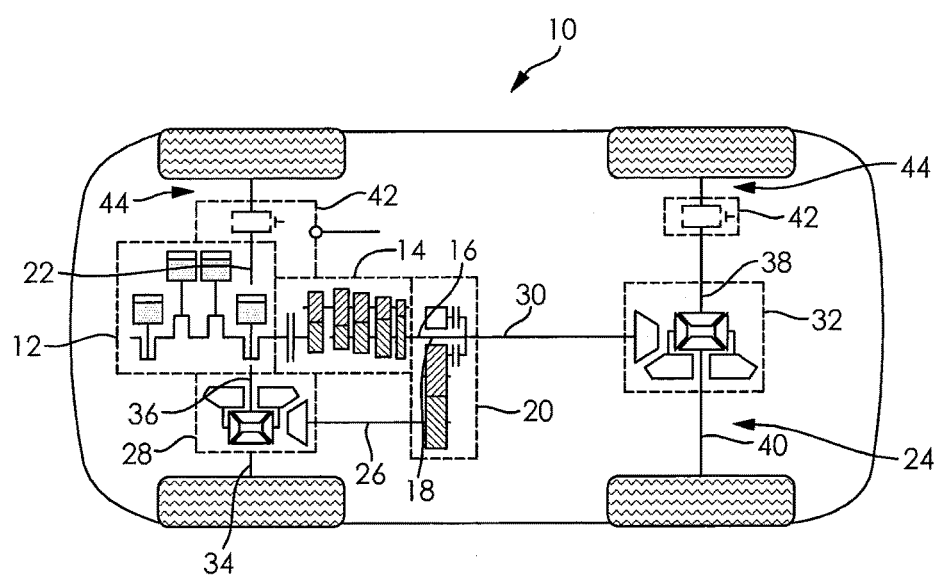
FIG. 1 is a schematic top-plan view of a vehicle having a vehicle connect and disconnect system according to this invention in the north south engine configuration.

FIG. 1 schematically illustrates a vehicle having a connect and disconnect system according to this invention. The vehicle 10 has an engine 12 which is drivingly connected to a transmission 14. A transmission output shaft 16 is then drivingly connected to the side of the transmission 14 opposite from the engine 12. The transmission 14 is a power management system which provides controlled application of the rotational power provided by the engine 12 by means of a gearbox.

The transmission output shaft 16 is drivingly connected to the transfer case input shaft 18. The transfer case input shaft 18 is connected to the transfer case 20. The transfer case 20 is used in four-wheel drive and AWD vehicles to transfer the rotational power from the transmission 14 to a front axle 22 and a rear axle 24 by utilizing a series of gears and drive shafts. The transfer case 20 additionally allows the vehicle 10 to selectively operate in either a two-wheel drive mode or a four-wheel/AWD mode.

A first transfer case output shaft 26 is drivingly connected to a front differential 28 and a second transfer case output shaft 30 is drivingly connected to a rear differential 32. The front differential 28 is connected to front axle half shafts 34 and 36. The rear differential 32 is connected to rear axle half shafts 38 and 40. As it can be seen by referencing FIG. 1, one end of the rapid connect and disconnect system 42 may be connected to the front axle half shafts 34 and 36 and/or the rear axle half shafts 38 and 40. On the opposite end of the rapid connect and disconnect system 42 from the axle half shafts 34, 36, 38 and 40, the rapid connect and disconnect system 42 is connected to a wheel assembly 44, as described in more detail below.

Figure 5:
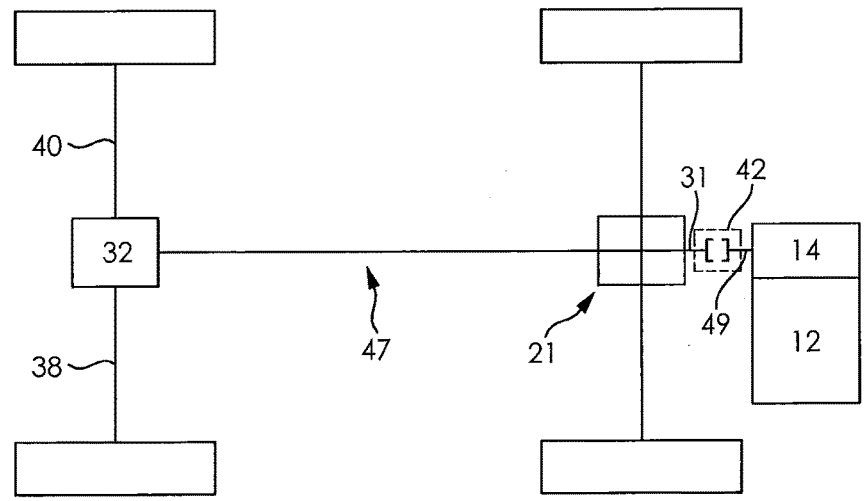
FIG. 5 is a schematic top-plan view of a vehicle having a vehicle connect and disconnect system according to this invention in the east west engine configuration.

In addition to the invention being used in the north south engine configuration illustrated in FIG. 1, the present invention may be used in an east west engine configuration as illustrated in FIG. 5. In the east west engine configuration, the rapid connect and disconnect system 42 is located between the transmission 14 and a power transfer unit 21 and can be incorporated into the power transfer unit assembly 21. When used in the east west engine configuration, an end of a power transfer unit input shaft 31 opposite the power transfer unit 21 is connected to the vehicle connect and disconnect system 42. The opposite end of the vehicle connect and disconnect system 42 is then connected to an end of a transmission output shaft 49 opposite the transmission 14. Connected to the opposite end of the power transfer unit 21 is a rear drive line 47. The end of the rear drive line 47 is then connected to a rear differential 32 which is then connected to a pair of rear axle half shafts 38 and 40. The rear differential 32 may additionally contain a clutch to disconnect the drive to one or both of the rear axle half shafts 38 and 40. When the vehicle connect and disconnect system 42 is used in this location, the rapid connect and disconnect system 42 functions to selectively connect and disconnect the rear drive line 47 as needed.

FIGS. 2, 2A and 2B illustrate a schematic cut-away side view and detail views of the vehicle connect and disconnect system according to a first embodiment of the invention. The vehicle connect and disconnect system 100 has a housing 102 that has a first end portion 104, a second end portion 106, a middle portion 108, an inner surface 110 and an outer surface 112. The inner surface 110 and the outer surface 112 of the housing 102 defines a hollow portion 114. The middle portion 108 of the housing 102 has an opening 116 extending from the outer surface 112 of the housing 102 to the inner surface 110 of the housing 102.

Figure 6:
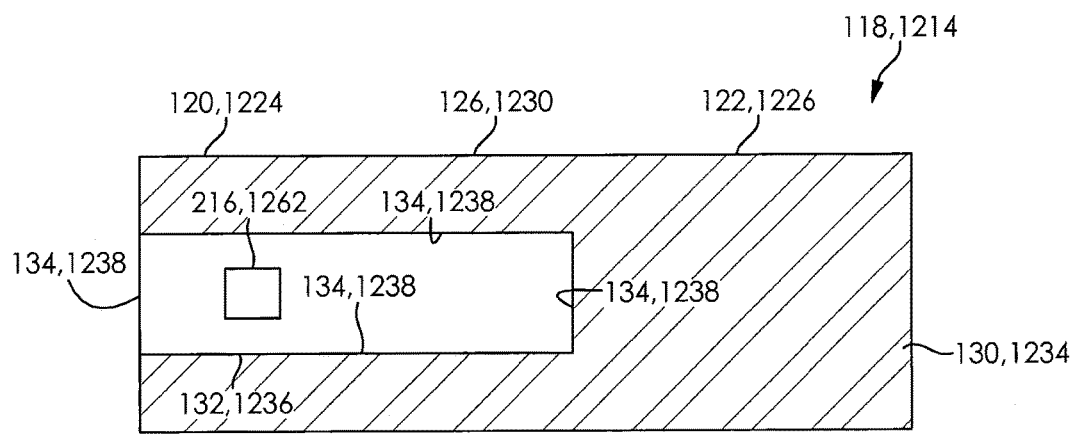
FIG. 6 is a schematic cut-away view illustrating the shape of the groove.

Within the housing 102 there is a lead screw 118 having a first end portion 120, a second end portion 122, an inner surface 124 and an outer surface 126. The inner surface 124 and the outer surface 126 of the lead screw 118 defines a hollow portion 128 therein. The lead screw 118 extends co-axially with the housing 102 such that at least a portion of the housing 102 surrounds the lead screw 118. On the outer surface 126 of the lead screw 118 there is a lead screw thread 130 that is cut into the outer surface 126 of the lead screw 118. Along the outer surface 126 of the lead screw thread 130 a groove 132 is cut transverse to the lead screw thread 130. The groove 132 itself has at least one radial wall 134 that terminates the groove 132. As illustrated in FIG. 6, the groove 132 is a rectangular channel that is cut into the outer surface 126 of the lead screw 118. The groove 132 extends axially inboard from the first end portion 120 of the lead screw 118 and perpendicular to the first end portion 120 of the lead screw 118. The pitch of the lead screw thread 130 may be any pitch that will allow the clutch to be locked in either an engaged or a disengaged position, as described below in more detail.

Within the hollow portion 128 of the lead screw 118 there is a stub shaft 136 having a first end portion 138, a second end portion 140, an inner surface 142 and an outer surface 144. The inner surface 142 and the outer surface 144 of the stub shaft 136 defines a hollow portion 146 therein. The stub shaft 136 extends co-axially with the housing 102 such that at least a portion of the housing 102 surrounds the stub shaft 136. At least a portion of the second end portion 140 of the stub shaft 136 has a diameter that is larger than the diameter of the first end portion 138 of the stub shaft 136. The larger diameter portion 148 of the stub shaft 136 has a plurality of clutch teeth 150 that extend circumferentially and axially outward from the second end portion 140 of the stub shaft 136. According to one embodiment of the invention the, the plurality of clutch teeth 150 may be a plurality of dog clutch teeth as illustrated in FIG. 2.

Extending co-axially with the stub shaft 136 is a first bushing 152 having a first end 154, a second end 156, an inner surface 158 and an outer surface 160. The inner surface 158 and the outer surface 160 of the first bushing 152 defines a hollow portion 162 therein. The inner surface 158 of the first bushing 152 is then integrally connected to the outer surface 144 of the first end portion 138 of the stub shaft 136.

Extending co-axially with the stub shaft 136 and axially inboard from the larger diameter portion 148 of the stub shaft 136 is a second bushing 164. The second bushing 164 has a first end 166, a second end 168, an inner surface 170 and an outer surface 172. The inner surface 170 and the outer surface 172 of the second bushing 164 defines a hollow portion 174 therein. The inner surface 170 of the second bushing 164 has a diameter that is larger than the outer diameter of the smaller diameter portion 176 of the stub shaft 136.

In an alternative embodiment of the invention, the inner surface 170 of the second bushing 164 may be integrally connected to the outer surface 178 of the smaller diameter portion 176 of the stub shaft 136.

The bushings help facilitate the rotation of the stub shaft 136 in relation to the lead screw 118 which reduces the amount of drag on a drive train which in turn increases drive train efficiency. In a non-limiting example, the first bushing 152 and the second bushing 164 may be a needle bearing (not shown), a ball bearing (not shown) or any other suitable roller bearing (not shown) that will help facilitate the rotation of the stub shaft 136 in relation to the lead screw 118

The vehicle connect and disconnect system 100 may also include at least one retention washer having a first end, a second end, an outer surface and an inner surface. The inner surface and the outer surface of the at least one retention washer defines a hollow portion therein. In an exemplary embodiment of the invention, the vehicle connect and disconnect system 100 may include a first retention washer 180 and a second retention washer 182. The first retention washer 180 has a first end 184, a second end 186, an inner surface 188 and an outer surface 190. The inner surface 186 and the outer surface 188 of the first retention washer 180 defines a hollow portion 192 therein. Similarly, the second retention washer 182 has a first end 194, a second end 196, an inner surface 198 and an outer surface 200. The inner surface 194 and the outer surface 196 if the second retention washer 182 defines a hollow portion 202 therein. When two retention washers are used the first retention washer 180 is disposed adjacent to and axially inboard from the second end 156 of the first bushing 152 and the second retention washer 182 is disposed axially inboard from the first end portion 166 of the second bushing 164. In operation, the at least one retention washer is used to ensure that the lead screw 118 is retained around the smaller diameter portion 176 of the stub shaft 136.

In an alternative embodiment of the invention, the vehicle connect and disconnect system 100 may further include at least one additional bushing (not shown). The at least one additional bushing (not shown) has a first end, a second end, an inner surface and an outer surface. The inner surface and the outer surface of the at least one additional bushing (not shown) defines a hollow portion therein. When used, the at least one additional bushing (not shown) would be disposed between the inner surface 124 of the lead screw 118 and the outer surface 178 of the smaller diameter portion 176 of the stub shaft 136. In operation the at least one additional bushing (not shown) would further aid in facilitating the rotation of the stub shaft 136 in relation to the lead screw 118 thereby further increasing drive train efficiency. In a non-limiting example, the at least one additional bushing (not shown) may be a needle bearing (not shown), a ball bearing (not shown) or any other suitable roller bearing (not shown) that will help facilitate the rotation of the stub shaft 136 in relation to the lead screw 118.

Connected to the stub shaft 136 there is a first shaft 204 that extends co-axially with the stub shaft 136. The first shaft 204 has a first end portion 206, a second end portion 208 and an outer surface 210. The first end portion 206 of the first shaft 204 is connected to a source of rotational energy. As a non-limiting example, the source of rotational energy may be an engine, a differential, a transmission, a transfer case, a propeller shaft, an axle half shaft, a power transfer unit or a drive shaft. The second end portion 208 of the first shaft 204 extends into the hollow portion 146 of the stub shaft 136 and the outer surface 210 of the first shaft 204 is integrally connected to the inner surface 142 of the stub shaft 136. The inner surface 142 of the stub shaft 136 may further include a plurality of splines 212 that extend circumferentially from the inner surface 142. Additionally, the outer surface 210 of the second end portion 208 of the first shaft 204 may further include a plurality of splines 214 that extend circumferentially from the outer surface 210 of the first shaft 204. The plurality of splines 214 extending from the outer surface 210 of the first shaft 204 are complementary to and mesh with the plurality of splines 212 on the inner surface 142 of the stub shaft 136. In operation the plurality of splines 212 on the inner surface 142 of the stub shaft 136 are always meshing with the plurality of splines 214 on the outer surface 210 of the first shaft 208.

A pin 216 is utilized to restrict the axial movement of the lead screw 118. The pin 216 has a first end portion 218 and a second end portion 220 wherein the first end portion 220 of the pin 213 is connected to the inner surface 124 of the first end portion 120 of the housing 102. The pin 216 then extends radially inward from the inner surface 124 of the housing 102 so that at least a portion of the second end portion 220 of the pin 216 extends within the groove 132. The groove 132 moves with respect to the pin 216 until the pin 216 abuts one of the radial walls 134 of the groove 132. When the pin 216 contacts the radial wall 134 of the groove 132, it prevents the lead screw 118 from moving beyond a predetermined amount.

The pin 216 may further include a pin housing 222 as illustrated in FIG. 2. The pin housing 222 is a recess 224 that is located in the inner surface 124 of the first end portion 120 of the housing 102. Within the pin housing 222 there is at least one bearing 226 disposed therein. At least a portion of the first end portion 218 of the pin 216 is mounted within the at least one bearing 226 to allow the pin 216 to rotate within the pin housing 222.

Co-axial with the first shaft 204 there is a second shaft 228. The second shaft 228 has a first end portion 230 and a second end portion 232. The first end portion 230 of the second shaft 228 has a plurality of clutch teeth 234 that extend circumferentially and axially outward from the first end portion 230 of the second shaft 228. The plurality of clutch teeth 234 on the first end portion 230 of the second shaft 228 are complementary to the plurality of clutch teeth 150 on the second end portion 140 of the stub shaft 136. Like the plurality of clutch teeth 150 on the second end portion 140 of the stub shaft 136, the plurality of clutch teeth 234 on the first end portion 230 of the second shaft 228 may be a plurality of dog clutch teeth. When in operation, the plurality of clutch teeth 234 on the first end portion 230 of the second shaft 228 are selectively engagable with the plurality of clutch teeth 150 on the second end portion 140 of the stub shaft 136.

Connected to the lead screw thread 130 there is a ring gear 236 that is co-axial with the lead screw 118. The ring gear 236 is located within the housing 102 and radially inboard from the opening 116 in the middle portion 108 of the housing 102. The ring gear 236 has an inner surface 238 and an outer surface 242 wherein the inner surface 238 and the outer surface 242 of the ring gear 236 defines a hollow portion 243 therein. The inner surface 238 of the ring gear 236 has one or more teeth 240 that are complementary to and mesh with the lead screw thread 130 on the outer surface 126 of the lead screw 118. When in operation the one or more teeth 240 on the inner surface 238 of the ring gear 236 are always engaged with the lead screw thread 130 on the outer surface 126 of the lead screw 118. The ring gear 236 is used to selectively move the lead screw 118 which in turn selectively connects or disconnects the stub shaft 136 with the second shaft 228. Additionally, the outer surface 242 of the ring gear 236 has a plurality of teeth 244 extending radially outward from the outer surface 242.

Connected to the outer surface of the ring gear 236 there is a connecting gear 246 that has an axis that is parallel to that of the ring gear 236. The connecting gear 246 has an outer surface that extends through the opening 116 in the housing 102 to the ring gear 236. On the outer surface 248 of the connecting gear 246 there is a plurality of teeth 250 that are complementary to and mesh with the plurality of teeth 244 on the outer surface 242 of the ring gear 236. The plurality of teeth 250 of the outer surface 248 of the connecting gear 246 extend circumferentially and radially outward from the outer surface 248 of the connecting gear 246.

In order to drive the connect and disconnect system 100 of the present invention, a motor 252 having an axis that is parallel to that of the connecting gear 246 is used. As a non-limiting example, the motor 252 used in connection with the present invention may be an electric motor. The motor 252 has a motor shaft 254 having a first end portion 256, a second end portion 258 and an outer surface 260. The motor 252 and the motor shaft 254 have an axis that is parallel to the axis of the connecting gear 246. Connected to the first end portion 256 of the motor shaft 254 is the motor 252. On the outer surface 260 of the second end portion 258 of the motor shaft 254 there is a plurality of teeth 262 extending circumferentially and radially outward from the outer surface 260 of the second end 258 of the motor shaft 254. The plurality of teeth 262 are complementary to and mesh with the plurality of teeth 250 on the outer surface 248 of the connecting gear 246.

In an alternative embodiment of the invention, the vehicle connect and disconnect system 100 of the present invention may further include the use of a third shaft 270. The third shaft 270 has a first end portion 272, a second end portion 274 and an outer surface 276. In accordance with the embodiment of the invention when the third shaft 270 is used, the second shaft 228 further includes an inner surface 278 and an outer surface 280. The inner surface 278 and the outer surface 280 of the second shaft 228 defines a hollow portion 282 therein. At least a portion of the first end portion 272 of the third shaft 270 extends into the hollow portion 282 of the second shaft 228. The inner surface 278 of the second shaft 228 is then integrally connected to the outer surface 276 of the first end portion 272 of the third shaft 270. In an alternative embodiment of the invention, the inner surface 278 of the second shaft 228 further includes a plurality of splines 284 that extend circumferentially from the inner surface 278 of the second shaft 228. Additionally, the outer surface 276 of the first end portion 272 of the third shaft 270 includes a plurality of splines 286 that extend circumferentially from the outer surface 276 of the third shaft 270. The plurality of splines 286 on the outer surface 276 of the third shaft 270 are complementary to and meshingly engaged with the plurality of splines 284 on the inner surface 278 of the second shaft 228.

Figure 4:
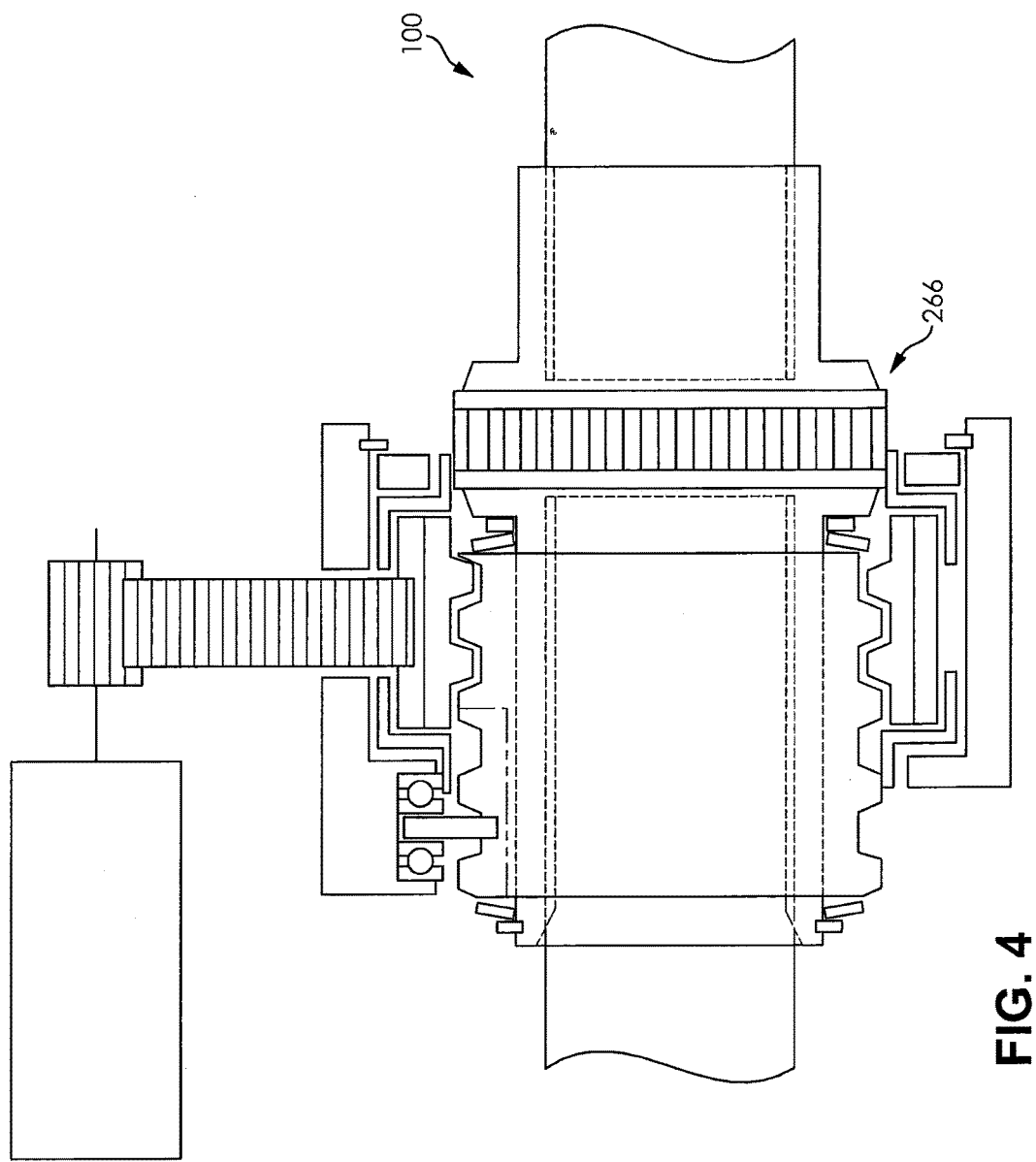
FIG. 4 is a schematic cut-away view of the vehicle connect and disconnect system wherein the stub shaft from FIG. 2 is in its second position.

When in operation, the motor 252 is activated to rotate the ring gear 236 one direction or the other which rotates the lead screw 118 which in turn moves the lead screw 118 axially till it contacts either the first retention washer 180 or the second retention washer 182. Once the lead screw 118 contacts the retention washer 180 or 182, the ring gear 236 will continue to rotate thereby moving the stub shaft 136 from a first position 264 to a second position 266. As illustrated in FIG. 2, when the stub shaft 136 is located in its first position 264 the plurality of clutch teeth 150 on the second end portion 140 of the stub shaft 136 are not engaged with the plurality of clutch teeth 234 on the first end portion 230 of the second shaft 228 defining a gap 268 therebetween. When the stub shaft 136 is in its second position 266, as illustrated in FIG. 4, the plurality of clutch teeth 150 on the second end portion 140 of the stub shaft 136 are engaged with the plurality of clutch teeth 234 on the first end portion 230 of the second shaft 228. When the embodiment of FIG. 2 is used, the system 100 may require the use of a motor current and motor position monitoring device (not shown) which will actively detect when the clutch is blocked.

Figure 3:
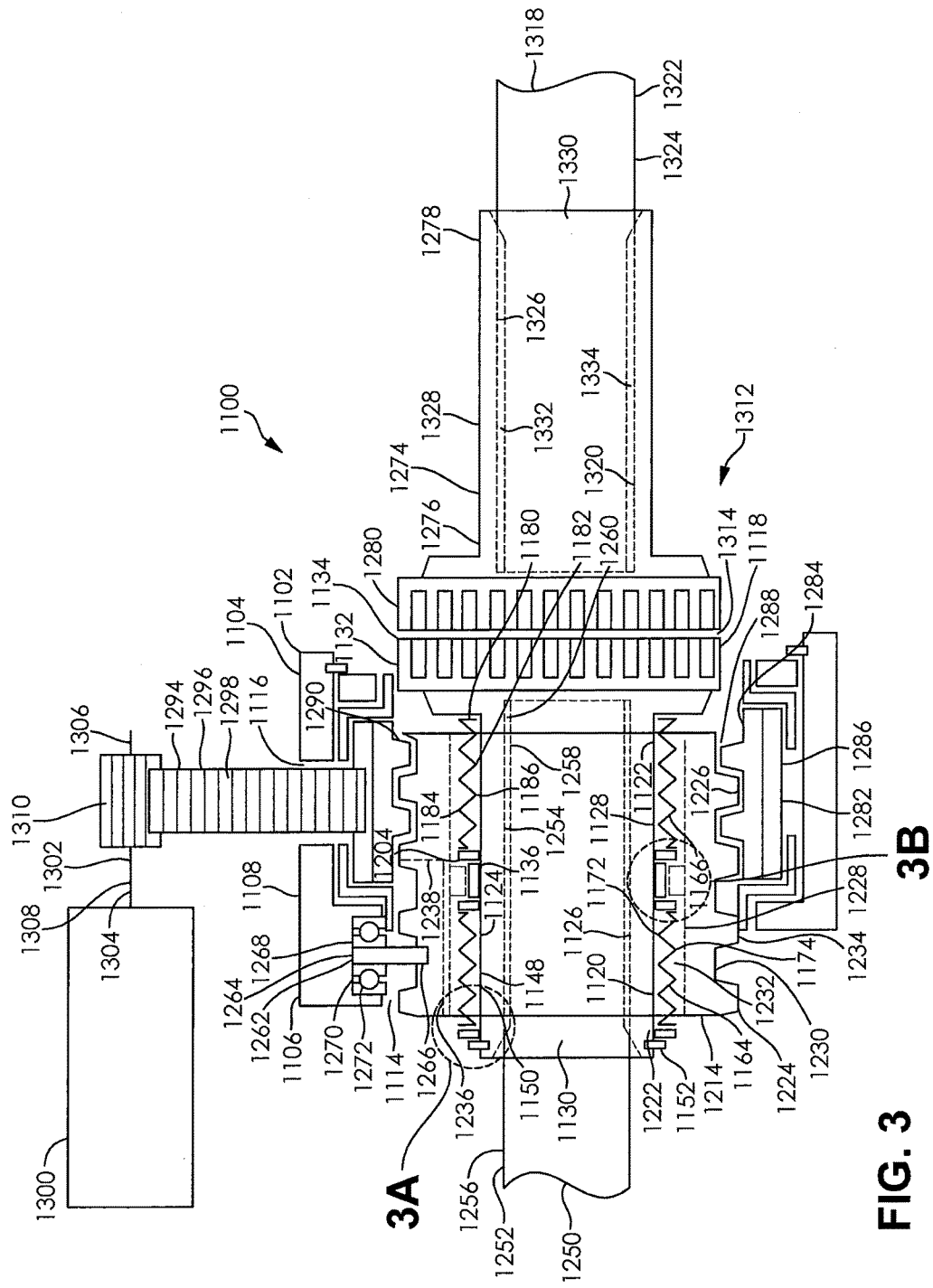
FIG. 3 is a schematic cut-away side view of the vehicle connect and disconnect system according to another embodiment of the invention utilizing a spring with a sliding collar.
Figure 3A:
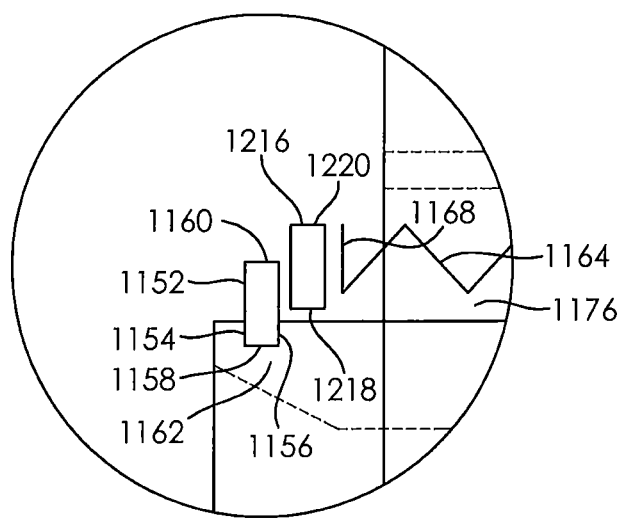
FIG. 3A is a schematic cut-away view of the vehicle connect and disconnect system according to the embodiment of the invention utilizing a spring with a sliding collar from section A of FIG. 3.
Figure 3B:
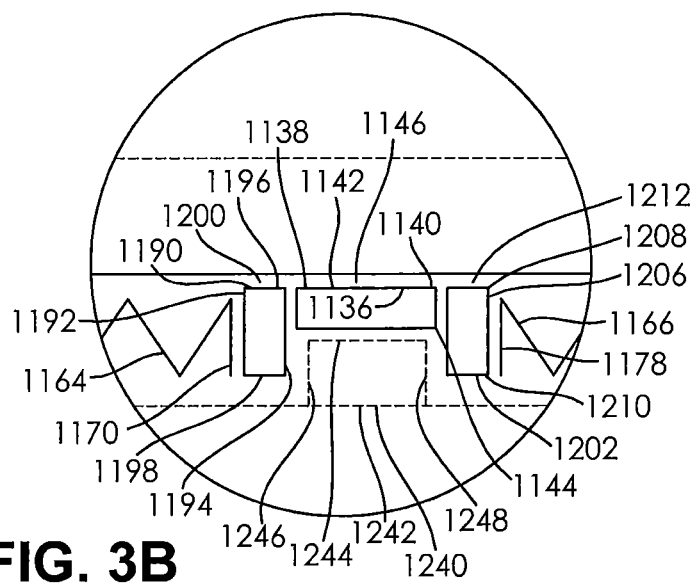
FIG. 3B is a schematic cut-away view of the vehicle connect and disconnect system according to the embodiment of the invention utilizing a spring with a sliding collar from section B of FIG. 3.

FIGS. 3, 3A and 3B illustrate a schematic cut-away side view and detail views of the vehicle connect and disconnect system 1100 according to another embodiment of the invention. The vehicle connect and disconnect system 1100 has a housing 1102 that has a first end portion 1104, a second end portion 1106, a middle portion 1108, an inner surface 1110 and an outer surface 1112. The inner surface 1110 and the outer surface 1112 of the housing 1102 defines a hollow portion 1114 therein. The middle portion 1108 of the housing 1102 has an opening 1116 extending from the outer surface 1112 of the housing 1102 to the inner surface 1110 of the housing 1102.

Within the hollow portion 1114 of the housing 1102 there is a stub shaft 1118 having a first end portion 1120, a second end portion 1122, a middle portion 1124, an inner surface 1126 and an outer surface 1128. The inner surface 1126 and the outer surface 1128 of the stub shaft 1118 defines a hollow portion 1130 therein. The stub shaft 1118 extends co-axially with the housing 1102 and at least a portion of the housing 1102 surrounds the stub shaft 1118. At least a portion of the outer surface 1128 of the second end portion 1122 of the stub shaft 1118 has a diameter that is larger than the diameter of the outer surface of the first end portion 1120 and the middle portion 1124 of the stub shaft 1118. The larger diameter portion 1132 of the stub shaft 1118 has a plurality of clutch teeth 1134 that extend circumferentially and axially outboard from the second end portion 1122 of the stub shaft 1118. According to one embodiment of the invention the, the plurality of clutch teeth 1134 on the larger diameter portion 1132 of the second end portion 1122 of the stub shaft 1118 may be a plurality of dog clutch teeth.

The vehicle connect and disconnect system 1100 further includes a sliding collar 1136 having a first end 1138, a second end 1140, an inner surface 1142 and an outer surface 1144. The inner surface 1142 and the outer surface 1144 of the sliding collar 1136 defines a hollow portion 1146 therein. The inner surface 1142 of the sliding collar 1136 has a diameter that is larger than an outer diameter 1148 of the smaller diameter portion 1150 of the stub shaft 1118. At least a portion of the first end portion 1120 and the middle portion 1124 of the stub shaft 1118 extends through the sliding collar 1136 such that the sliding collar 1136 is co-axial with the stub shaft 1118. When in use, the sliding collar 1136 will be in sliding engagement with the stub shaft 1118.

In one embodiment of the invention, the sliding collar 1136 has an uninterrupted outer surface as shown in FIG. 3. Alternatively, in another embodiment of the invention, the sliding collar 1136 may include a channel (not shown) that is cut into the outer surface of the sliding collar 1136 and extends radially inward from the outer surface of the sliding collar 1136. The channel (not shown) will then extend circumferentially along the outer surface of the sliding collar 1136.

Extending co-axially with the stub shaft 1118 is a first bushing 1152 having a first end 1154, a second end 1156, an inner surface 1158 and an outer surface 1160. The inner surface 1158 and the outer surface 1160 of the first bushing 1152 defines a hollow portion 1162 therein. The inner surface 1158 of the first bushing 1152 is then integrally connected to the outer surface 1144 of the first end portion 1138 of the stub shaft 1118.

In sliding engagement with the stub shaft 1118 there is a first spring 1164 and a second spring 1166 that extend co-axially with the stub shaft 1118 and are disposed radially outward from the outer surface 1144 of the stub shaft 1118. The first spring 1164 has a first end 1168, a second end 1170, an inner diameter 1172 and an outer diameter 1174. The inner diameter 1172 and the outer diameter 1174 of the first spring 1164 defines a hollow portion 1176 therein. Similarly, the second spring 1166 has a first end 1178, a second end 1180, an inner diameter 1182 and an outer diameter 1184. The inner diameter 1182 and the outer diameter 1184 of the second spring 1166 defines a hollow portion 1186 therein. As illustrated in FIG. 3, the inner diameter 1172 and 1182 of the springs 1164 and 1166 have a diameter that is larger than the diameter of the outer surface of the first end portion 1120 and the middle portion 1124 of the stub shaft 1118. The first end 1168 of the first spring 1164 is adjacent to the second end 1156 of the first bushing 1152 and the second end 1170 of the first spring 1164 is adjacent to the first end 1138 of the sliding collar 1136. The first end 1178 of the second spring 1166 is adjacent to the second end 1140 of the sliding collar 1136 and the second end 1180 of the second spring 1166 is adjacent to the larger diameter portion 1132 of the stub shaft 1118.

The vehicle connect and disconnect system 1100 may further include a second bushing (not shown) extending co-axially with the stub shaft 1118 and having a first end, a second end, an inner surface and an outer surface. The inner surface and the outer surface of the second bushing (not shown) defines a hollow portion therein. The second bushing (not shown) is then be located axially inboard from the larger diameter portion 1132 of the stub shaft 1118. When used, the first end of the second bushing (not shown) is adjacent to the second end 1180 of the second spring 1166. The second end of the second bushing (not shown) is then be adjacent to the larger diameter portion 1132 of the second end portion 1122 of the stub shaft 1118. The inner surface of the second bushing (not shown) has a diameter that is larger than the diameter of the outer surface of the first end portion 1120 and the middle portion 1124 of the stub shaft 1118. In an alternative embodiment of the invention, the inner surface of the second bushing (not shown) may be integrally connected to the outer surface 1188 of the smaller diameter portion 1150 of the stub shaft 1118.

The vehicle connect and disconnect system 1100 may further include a third bushing 1190 extending co-axially with said stub shaft 1118 and having a first end 1192, a second end 1194, an inner surface 1196 and an outer surface 1198. The inner surface 1196 and the outer surface 1198 of the third bushing 1190 defines a hollow portion 1200 therein. As illustrated in FIG. 3, the inner surface 1196 of the third bushing 1190 has a larger diameter than the diameter of the outer surface of the first end portion 1120 and the middle portion 1124 of the stub shaft 1118. Adjacent to the first end 1192 of the third bushing 1190 is the second end 1170 of the first spring 1164 and the second end 1194 of the third bushing 1190 is adjacent to the first end 1138 of the sliding collar 1136.

Additionally, vehicle connect and disconnect system 1110 may further include a fourth bushing 1202 extending co-axially with said stub shaft 1118 and having a first end 1204, a second end 1206, an inner surface 1208 and an outer surface 1210. The inner surface 1208 and the outer surface 1210 of the fourth bushing 1202 defines a hollow portion 1212 therein. As illustrated in FIG. 3, the inner surface 1208 of the fourth bushing 1202 has a larger diameter than the diameter of the outer surface of the first end portion 1120 and the middle portion 1124 of the stub shaft 1118. Adjacent to the first end 1204 of the fourth bushing 1202 is the second end 1170 of the first spring 1164 and the second end 1206 of the fourth bushing 1202 is adjacent to the first end 1138 of the sliding collar 1136.

As previously discussed, the bushings provide a surface which helps facilitate the rotation of the stub shaft 1118 in relation to a lead screw 1214 which reduces the amount of drag on a drive train which in turn increases drive train efficiency. In a non-limiting example, the first bushing 1152, the second bushing (not shown), the third bushing 1190 and the fourth bushing 1202 may be a needle bearing, a ball bearing or any other suitable roller bearing that will help facilitate the rotation of the stub shaft 1118 in relation to the lead screw 1214.

As illustrated in FIG. 3, the stub shaft 1118 may further include at least one retention washer 1216. The at least one retention washer 1216 is disposed adjacent to at least one end of the first spring 1164 and the second spring 1166. The at least one retention washer 1216 has an inner surface 1218 and an outer surface 1220 which defines a hollow portion 1222 therein. The diameter of the inner surface 1218 of the at least one retention washer 1216 is larger than the diameter of the outer surface of the first end portion 1120 and the middle portion 1124 of the stub shaft 1118. In operation the at least one retention washer 1216 is used to ensure that the first spring 1164 and the second spring 1166 remain in place. As illustrated in FIG. 3, the at least one retention washer 1216 is used to ensure that the first spring 1164 is retained between the first bushing 1152 and the sliding collar 1136. Additional retention washers may be used to ensure that the first spring 1164 is retained between the first bushing 1152 and the sliding collar 1136 and to ensure that the second spring 1166 is retained between the sliding collar 1136 and the larger diameter portion 1132 of the second end portion 1122 of the stub shaft 1118.

The vehicle connect and disconnect system 1100 may further include the use of one or more spring plugs (not shown) or spring caps (not shown) made of any suitable material. According to an alternative embodiment of the invention, the one or more spring plugs (not shown) or spring caps (not shown) can be used with or without the at least one retention washer 1216. The one or more spring plugs (not shown) or spring caps (not shown) are disposed at one or both ends of the first spring 1164 and/or the second spring 1166 to help facilitate rotation of the stub shaft 1118 with respect to the springs 1164 and 1166.

Within hollow portion 1114 of the housing 1102 there is a lead screw 1214 having a first end portion 1224, a second end portion 1226, an inner surface 1228 and an outer surface 1230. The inner surface 1228 and the outer surface 1230 of the lead screw 1214 defines a hollow portion 1232 therein. The lead screw 1214 extends co-axially with the housing 1102 and at least a portion of the housing 1102 surrounds the lead screw 1214. The inner surface 1228 of the lead screw 1214 has a larger diameter than the diameter of the outer diameters of the first bushing 1152, the second bushing (not shown), the third bushing 1190, the fourth bushing 1202, the sliding collar 1136, the first spring 1164, the second spring 1166, the at least one retention washer 1216 and the one or more spring plugs (not shown) or spring caps (not shown). On the outer surface 1230 of the lead screw 1214 there is a lead screw thread 1234 that is cut into the outer surface 1230 of the lead screw 1214. Along the outer surface 1230 of the lead screw thread 1234 a groove 1236 is cut transverse to the lead screw thread 1234. The groove 1236 itself has at least one radial wall 1238 that terminates the groove 1236. As illustrated in FIG. 6, the groove 1236 is a rectangular channel that is cut into the outer surface 1230 of the lead screw 1214. The groove 1236 extends axially inboard from the first end portion 1224 of the lead screw 1214 and perpendicular to the first end portion 1224 of the lead screw 1214. The pitch of the lead screw thread 1234 may be any pitch that will allow the clutch to be locked in either an engaged or a disengaged position.

Extending circumferentially and radially inward from the inner surface 1228 of the lead screw 1214 is a lead screw collar 1240 having a first end 1242, a second end 1244, a first side 1246 and a second side 1248. At least a portion of the second end 1244 of the lead screw collar 1240 extends between the second end 1170 of the first spring 1164 and the first end 1178 of the second spring 1166. Similarly, when disposed between the first spring 1164 and the second spring 1166, the second end 1170 of the first spring 1164 is adjacent to the first side 1246 of the lead screw collar 1240 and the first end 1178 of the second spring 1166 is adjacent to the second side 1248 of the lead screw collar 1240. In the embodiment of the invention when the sliding collar 1136 includes the channel (not shown), at least a portion of the second end 1244 of the lead screw collar 1240 extends into the channel (not shown) of the sliding collar 1136.

Connected to the stub shaft 1118 there is a first shaft 1250 that extends co-axially with the stub shaft 1118. The first shaft 1250 has a first end portion 1252, a second end portion 1254 and an outer surface 1256. The first end portion 1252 of the first shaft 1250 is connected to a source of rotational energy. As a non-limiting example, the source of rotational energy may be an engine, a differential, a transmission, a transfer case, a propeller shaft, an axle half shaft, a power transfer unit or a drive shaft. The second end portion 1254 of the first shaft 1250 extends into the hollow portion 1130 of the stub shaft 1118 and the outer surface 1256 of the first shaft 1250 is integrally connected to the inner surface 1126 of the stub shaft 1118. The inner surface 1126 of the stub shaft 1118 may further include a plurality of splines 1258 that extend circumferentially and radially inward from the inner surface 1126 of the stub shaft 1118. Additionally, the outer surface 1256 of the second end 1254 of the first shaft 1250 may further include a plurality of splines 1260 that extend circumferentially and radially outward from the outer surface 1256 of the first shaft 1250. The plurality of splines 1260 extending from the outer surface 1256 of the first shaft 1250 are complementary to and mesh with the plurality of splines 1258 on the inner surface 1126 of the stub shaft 1118. In operation the plurality of splines 1258 on the inner surface 1126 of the stub shaft 1118 are always meshing with the plurality of splines 1260 on the outer surface 1256 of the first shaft 1250.

A pin 1262 is utilized to restrict the axial movement of the lead screw 1214. The pin 1262 has a first end portion 1264 and a second end portion 1266 wherein the first end portion 1264 of the pin 1262 is connected to the inner surface 1110 of the first end portion 1104 of the housing 1102. The pin 1262 then extends radially inward from the inner surface 1110 of the housing 1102 so that at least a portion of the second end portion 1266 of the pin 1262 extends within the groove 1236. The groove 1236 moves with respect to the pin 1262 until the pin 1262 abuts one of the radial walls 1238 of the groove 1236. When the pin 1262 contacts the radial wall 1238 of the groove 1236, it prevents the lead screw 1214 from moving beyond a predetermined amount.

The pin 1262 may further include a pin housing 1268 as illustrated in FIG. 3. The pin housing 1268 is a recess 1270 that is located in the inner surface 1110 of the first end portion 1104 of the housing 1102. Within the pin housing 1268 there is at least one bearing 1272 disposed therein. At least a portion of the first end portion 1264 of the pin 1262 is mounted within the at least one bearing 1272 to allow the pin 1262 to freely rotate within the pin housing 1268.

Co-axial with the first shaft 1250 there is a second shaft 1274. The second shaft 1274 has a first end portion 1276 and a second end portion 1278. The first end portion 1276 of the second shaft 1274 has a plurality of clutch teeth 1280 that extend circumferentially and axially outward from the first end portion 1276 of the second shaft 1274. The plurality of clutch teeth 1280 on the first end portion 1276 of the second shaft 1274 are complementary to the plurality of clutch teeth 1134 on the second end portion 1122 of the stub shaft 1118. Like the plurality of clutch teeth 1134 on the second end portion 1122 of the stub shaft 1118, the plurality of clutch teeth 1280 on the first end portion 1276 of the second shaft 1274 may be a plurality of dog clutch teeth. When in operation, the plurality of clutch teeth 1280 on the first end portion 1276 of the second shaft 1274 are selectively engagable with the plurality of clutch teeth 1134 on the second end portion 1122 of the stub shaft 1118.

Connected to the lead screw thread 1234 there is a ring gear 1282 that is co-axial with the lead screw 1214. The ring gear 1282 is located within the hollow portion 1114 of the housing 1102 and radially inboard from the opening 1116 in the middle portion 1108 of the housing 1102. The ring gear 1282 has an inner surface 1284 and an outer surface 1286 defining a hollow portion 1288 therein. The inner surface 1284 of the ring gear 1282 has one or more teeth 1290 that are complementary to and mesh with the lead screw thread 1234 on the outer surface 1230 of the lead screw 1214. When in operation the one or more teeth 1290 on the inner surface 1284 of the ring gear 1282 are always engaged with the lead screw thread 1234 on the outer surface 1230 of the lead screw 1214. The ring gear 1282 is used to selectively move the lead screw 1214 which in turn selectively connects or disconnects the stub shaft 1118 with the second shaft 1274. The outer surface 1286 of the ring gear 1282 has a plurality of teeth 1292 that extend circumferentially and radially outward from the outer surface 1286 of the ring gear 1282.

Connected to the outer surface 1286 of the ring gear 1282 there is a connecting gear 1294 that has an axis that is parallel to that of the ring gear 1282. The connecting gear 1294 has an outer surface 1296 that extends through the opening 1116 in the housing 1102 to the plurality of clutch teeth 1292 on the outer surface 1286 of the ring gear 1282. On the outer surface 1296 of the connecting gear 1294 there is a plurality of teeth 1298 extending circumferentially and radially outward from the outer surface 1296 of the connecting gear 1294. The plurality of teeth 1298 on the outer surface 1296 of the connecting gear 1294 are complementary to and mesh with the plurality of teeth 1292 on the outer surface 1286 of the ring gear 1282.

In order to drive the connect and disconnect system 1100 of the present invention, a motor 1300 having an axis that is parallel to that of the connecting gear 1294 is used. As a non-limiting example, the motor 1300 used in connection with the present invention may be an electric motor. The motor 1300 has a motor shaft 1302 having a first end portion 1304, a second end portion 1306 and an outer surface 1308. The motor 1300 and the motor shaft 1302 have an axis that is parallel to the axis of the connecting gear 1294. Connected to the first end portion 1304 of the motor shaft 1302 is the motor 1300. On the outer surface 1308 of the second end portion 1306 of the motor shaft 1302 there is a plurality of teeth 1310 extending circumferentially and radially outward from the outer surface 1308 of the second end portion 1306 of the motor shaft 1302. The plurality of teeth 1310 on the outer surface 1308 of the second end portion 1306 of the motor shaft 1302 are complementary to and mesh with the plurality of teeth 1298 on the outer surface 1296 of the connecting gear 1294.

In an alternative embodiment of the invention, the vehicle connect and disconnect system 1100 of the present invention may further include the use of a third shaft 1318. The third shaft 1318 has a first end portion 1320, a second end portion 1322 and an outer surface 1324. In accordance with the embodiment of the invention when the third shaft 1318 is used, the second shaft 1274 further includes an inner surface 1326 and an outer surface 1328. The inner surface 1326 and the outer surface 1328 of the second shaft 1274 defines a hollow portion 1330 therein. At least a portion of the first end portion 1320 of the third shaft 1318 extends into the hollow portion 1330 of the second shaft 1274. The inner surface 1326 of the second shaft 1274 is then integrally connected to the outer surface 1324 of the first end portion 1320 of the third shaft 1318. In an alternative embodiment of the invention, the inner surface 1326 of the second shaft 1274 further includes a plurality of splines 1332 that extend circumferentially from the inner surface 1326 of the second shaft 1274. Additionally, the outer surface 1324 of the first end portion 1320 of the third shaft 1318 includes a plurality of splines 1334 that extend circumferentially from the outer surface 1324 of the third shaft 1318. The plurality of splines 1334 on the outer surface 1324 of the third shaft 1318 are complementary to and meshingly engaged with the plurality of splines 1332 on the inner surface 1326 of the second shaft 1274.

Figure 7:
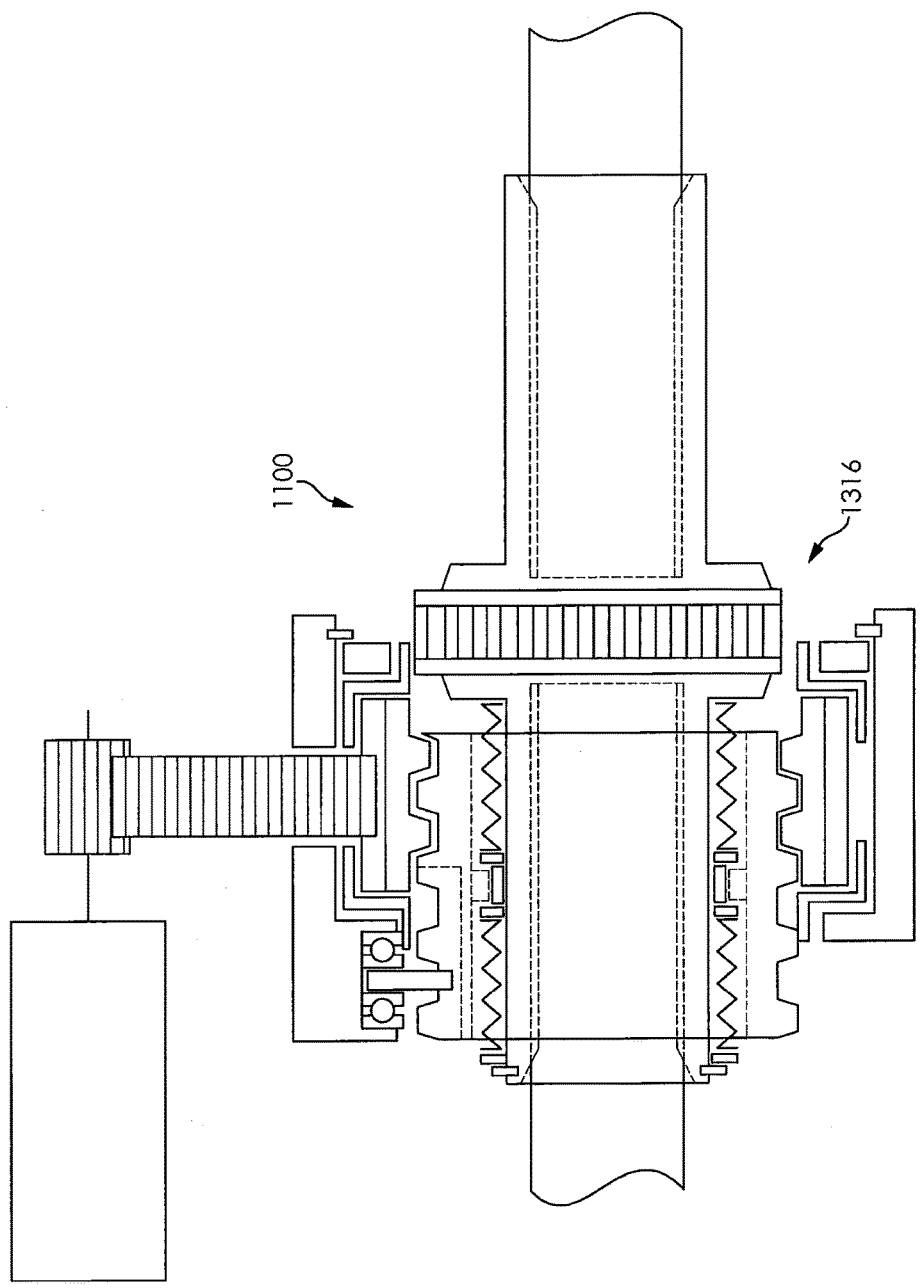
FIG. 7 is a schematic cut away view of the vehicle connect and disconnect system wherein the stub shaft from FIG. 3 is in its second position.

When in operation, the motor 1300 is activated to rotate the ring gear 1282 one direction or the other which rotates the lead screw 1214 which in turn moves the lead screw 1214 axially. As the lead screw collar 1240 axially moves in either direction it forces the first spring 1164 and the second spring 1166 to extend and compress accordingly. In response to this action, the sliding collar 1136 is moved such that the sliding collar 1136 is always radially adjacent to the lead screw collar 1240. As the lead screw 1214 is axially moved to the left, to the first position 1312, the lead screw collar 1240 causes the first spring 1164 to compress and the second spring 1166 to extend. Conversely, as the lead screw 1214 is axially moved to the right, to the second position 1316 as illustrated in FIG. 7, it compresses the second spring 1166 and extends the first spring 1164. This action loads the springs 1164 and 1166 with the energy necessary to selectively engage or disengage the clutch teeth 1134 and 1280. The springs 1164 and 1166 allow for full travel of the motor 1300 and the lead screw 1214 regardless of the clutch state, even if the clutch teeth 1134 and 1280 are blocked. Once the clutch teeth 1134 and 1280 are unblocked, the energy stored in the first spring 1164 and the second spring 1166 will force the clutch teeth 1134 and 1280 either into or out of engagement. As illustrated in FIG. 3, when the stub shaft 1118 is located in its first 1312 the plurality of clutch teeth 1134 on the second end portion 1122 of the stub shaft 1118 are not engaged with the plurality of clutch teeth 1280 on the first end portion 1276 of the second shaft 1274 defining a gap 1314 therebetween. When the stub shaft 1118 is in its second position 1316 as illustrated in FIG. 7, the plurality of clutch teeth 1134 on the second end portion 1122 of the stub shaft 1118 are engaged with the plurality of clutch teeth 1280 on the first end portion 1276 of the second shaft 1274. When the embodiment illustrated in FIG. 3 is used, the system 1100 does not require the use of a motor current and motor position monitoring device (not shown) to actively detect when the clutch is blocked.

What is claimed is:

1. A vehicle connect and disconnect system, comprising:
    a stub shaft having a first end portion, a second end portion, a middle portion and an outer surface;
        wherein said outer surface of said first end portion of said stub shaft has a first bushing having a first end, a second end, an inner surface and an outer surface;
        wherein said first bushing is connected to said outer surface of said first end portion of said stub shaft;
        wherein said second end portion of said stub shaft has a plurality of clutch teeth;
        wherein axially inboard from said plurality of clutch teeth on said second end portion of said stub shaft is a second bushing having a first end, a second end, an inner surface and an outer surface;
    a first shaft having a first end portion, a second end portion and an outer surface;
        wherein at least a portion of said first shaft is connected to said stub shaft;
    a second shaft having a first end portion and a second end portion;
        wherein said first end portion of said second shaft has a plurality of clutch teeth that are complementary to said plurality of clutch teeth on said second end portion of said stub shaft;
        wherein said plurality of clutch teeth on said first end portion of said second shaft are selectively engagable with said plurality of clutch teeth on said second end portion of said stub shaft;
    a lead screw having an inner surface and an outer surface;
        wherein said inner surface and said outer surface of said lead screw defines a hollow portion therein;
        wherein at least a portion of said stub shaft is disposed within said hollow portion of said lead screw;
        wherein said lead screw selectively engages said stub shaft;
        wherein said outer surface of said lead screw has a lead screw thread;
    wherein a groove extends into said outer surface of said lead screw;
    a housing having a first end portion, a second end portion, a middle portion, an inner surface and an outer surface;
        wherein said inner surface and said outer surface of said housing defines a hollow portion therein;
        wherein said inner surface of said housing has a recessed portion defining a pin housing;
        wherein said housing at least partially surrounds said lead screw and said stub shaft;
    a pin having a first end portion and a second end portion;
        wherein at least a portion of said first end portion of said pin is mounted for rotation within at least one bearing disposed within said pin housing;
        wherein at least a portion of said second end portion of said pin is located within said groove;
    a ring gear having an inner surface and an outer surface;
        wherein said inner surface of said ring gear is meshingly engaged with said lead screw thread on said outer surface of said lead screw to selectively rotate said lead screw; and
        wherein said outer surface of said ring gear is drivingly connected to a motor.

2. The vehicle connect and disconnect system of claim 1, wherein said first end portion of said first shaft is connected to a source of rotational power is selected from the group consisting of: an engine, a differential, a transmission, a transfer case, a propeller shaft, an axle half shaft, a power transfer unit or a drive shaft.

3. The vehicle connect and disconnect system of claim 1, wherein said stub shaft has a first position and a second position;
    wherein at said first position said plurality of clutch teeth on said second end portion of said stub shaft are not meshingly engaged with said plurality of clutch teeth on said first end portion of said second shaft defining a gap therebetween; and
    wherein at said second position said plurality of clutch teeth on said second end portion of said stub shaft are meshingly engaged with said plurality of clutch teeth on said first end portion of said second shaft.

4. The vehicle connect and disconnect system of claim 1, further comprising at least one retention washer having a first end, a second end, an inner surface and an outer surface;
    wherein said at least one retention washer is disposed between said second end of said first bushing and a first end of said lead screw; and
    wherein said at least one retention washer prevents said lead screw from axially moving off said stub shaft.

5. The vehicle connect and disconnect system of claim 1, wherein at least a portion of said outer surface of said second end portion of said stub shaft has a larger diameter than said outer surface of said first end portion and said middle portion of said stub shaft.

6. The vehicle connect and disconnect system of claim 1, wherein said first shaft further comprises a plurality of splines circumferentially extending from said outer surface of said second end portion of said first shaft;

wherein said inner surface of said stub shaft further comprises a plurality of splines circumferentially extending from said inner surface of said stub shaft; and wherein said plurality of splines extending from said inner surface of said stub shaft are complementary to and mesh with said plurality of splines on said outer surface of said second end portion of said first shaft.

7. The vehicle connect and disconnect system of claim 1, wherein said housing further comprises an opening;

wherein said opening extends from said outer surface of said housing to said inner surface of said housing; and wherein said ring gear is disposed radially inward from said opening in said housing.

8. The vehicle connect and disconnect system of claim 1, further comprising a third shaft having a first end portion and a second end portion;

wherein said second shaft further comprises an inner surface and an outer surface;

wherein said inner surface and said outer surface of said second shaft defines a hollow portion therein;

wherein at least a portion of said first end portion of said third shaft extends into said hollow portion of said second shaft; and wherein said outer surface of said third shaft is connected to said inner surface of said second shaft.

9. The vehicle connect and disconnect system of claim 1, further comprises at least one additional bushing having a first end, a second end, an inner surface and an outer surface;

wherein said inner surface and said outer surface of said at least one additional bushing defines a hollow portion therein; and wherein said at least one additional bushing is disposed between said inner surface of said lead screw and said outer surface of said stub shaft.

10. The vehicle connect and disconnect system of claim 1, further comprising a sliding collar having a first end, a second end, an inner surface and an outer surface;

wherein said inner surface and said outer surface of said sliding collar defines a hollow portion therein; and wherein said sliding collar is disposed between said inner surface of said lead screw and said outer surface of said stub shaft.

11. The vehicle connect and disconnect system of claim 10, wherein said sliding collar further includes a channel that is cut into said outer surface of said sliding collar; and wherein said channel extends circumferentially along said outer surface of said sliding collar.

12. The vehicle connect and disconnect system according to claim 10 or 11, further comprising a lead screw collar having a first end, a second end, a first side and a second side;

wherein said lead screw collar circumferentially extends radially inward from said inner surface of said lead screw; and wherein said second end of said lead screw collar at least partially extends into said channel in said outer surface of said sliding collar.

13. The vehicle connect and disconnect system of claim 12, further comprises a first spring and a second spring;

wherein said first spring has a first end, a second end, an inner diameter and an outer diameter;

wherein said first spring is disposed between said inner surface of said lead screw and said outer surface of said stub shaft;

wherein said first end of said first spring is adjacent to said second end of said first bushing;

wherein said second end of said first spring is adjacent to said first end of said sliding collar and said first side of said lead screw collar;

wherein said second spring has a first end, a second end, an inner diameter and an outer diameter;

wherein said second spring is disposed between said inner surface of said lead screw and said outer surface of said stub shaft;

wherein said first end of said second spring is adjacent to said second end of said sliding collar and said second side of said lead screw collar; and wherein said second end of said second spring is adjacent to said first end of said second bushing.

14. The vehicle connect and disconnect system of claim 1, wherein said groove is rectangular in shape.

15. A vehicle connect and disconnect system, comprising:

a stub shaft having a first end portion, a second end portion, an inner surface and an outer surface;

wherein said outer surface of said first end portion of said stub shaft has a first bushing having a first end, a second end, an inner surface and an outer surface;

wherein said first bushing is connected to said outer surface of said first end portion of said stub shaft;

wherein said second end portion of said stub shaft includes a plurality of clutch teeth;

wherein at least a portion of said outer surface of said second end portion of said stub shaft has a larger diameter than said outer surface of said first end portion and said middle portion of said stub shaft;

a first shaft having a first end portion, a second end portion and an outer surface;

wherein at least a portion of said second end portion of said first shaft is connected to said stub shaft;

a second shaft having a first end portion, a second end portion and an outer surface;

wherein said first end portion of said second shaft has a plurality of clutch teeth that are complementary to said plurality of clutch teeth on said second end portion of said stub shaft;

wherein said plurality of clutch teeth on said first end portion of said second shaft are selectively engagable with said plurality of clutch teeth on said second end portion of said stub shaft;

a lead screw having an inner surface and an outer surface;

wherein said inner surface and said outer surface of said lead screw defines a hollow portion therein;

wherein at least a portion of said stub shaft is disposed within said hollow portion of said lead screw;

wherein said lead screw selectively engages said stub shaft;

wherein said outer surface of said lead screw has a lead screw thread;

wherein a groove extends into said outer surface of said lead screw;

a lead screw collar having a first end, a second end, a first side and a second side;

wherein said lead screw collar circumferentially extends radially inward from said inner surface of said lead screw;

a sliding collar having a first end, a second end, an inner surface and an outer surface;

wherein said sliding collar is disposed between said inner surface of said lead screw and said outer surface of said stub shaft;

a first spring having a first end, a second end, an inner diameter and an outer diameter;

wherein said first spring is disposed between said inner surface of said lead screw and said outer surface of said stub shaft;
  wherein said first end of said first spring is adjacent to said second end of said first bushing and said second end of said first spring is adjacent to said first end of said sliding collar and said first side of said lead screw collar;
a second spring having a first end, a second end, an inner diameter and an outer diameter;
  wherein said second spring is disposed between said inner surface of said lead screw and said outer surface of said stub shaft;
  wherein said first end of said second spring is adjacent to said second end of said sliding collar and said second side of said lead screw collar and said second end of said second spring is adjacent to said larger diameter portion of said second end portion of said stub shaft;
a housing having a first end portion, a second end portion, an inner surface and an outer surface;
  wherein said inner surface and said outer surface of said housing defines a hollow portion therein;
  wherein said inner surface of said housing has a recessed portion defining a pin housing;
  wherein said housing at least partially surrounds said lead screw and said stub shaft;
a pin having a first end portion and a second end portion;
  wherein at least a portion of said first end portion of said pin mounted for rotation within at least one bearing disposed within said pin housing;
  wherein at least a portion of said second end portion of said pin is located within said groove;
a ring gear having an inner surface and an outer surface;
  wherein said inner surface of said ring gear is meshingly engaged with said lead screw thread on said outer surface of said lead screw; and
  wherein said outer surface of said ring gear is drivingly connected to a motor.

16. The vehicle connect and disconnect system of claim 15, wherein said first end portion of said first shaft is connected to a source of rotational power selected from the group consisting of: an engine, a differential, a transmission, a transfer case, a propeller shaft, an axle half shaft, a power transfer unit or a drive shaft.

17. The vehicle connect and disconnect system of claim 15, wherein said stub shaft has a first position and a second position;
  wherein at said first position said plurality of clutch teeth on said second end portion of said stub shaft are not meshingly engaged with said plurality of clutch teeth on said first end portion of said second shaft defining a gap therebetween; and
  wherein at said second position said plurality of clutch teeth on said second end portion of said stub shaft are meshingly engaged with said plurality of clutch teeth on said first end portion of said second shaft.

18. The vehicle connect and disconnect system of claim 15, wherein said sliding collar further comprises a channel that is cut into said outer surface of said sliding collar
  wherein said channel extends circumferentially along said outer surface of said sliding collar; and
  wherein said second end of said lead screw collar at least partially extends into said channel in said outer surface of said sliding collar.

19. The vehicle connect and disconnect system of claim 15, further comprising a second bushing;
  wherein said second bushing has a first end, a second end, an inner surface and an outer surface;
  wherein said first end of said second bushing is adjacent to said second end of said second spring; and
  wherein said second end of said second bushing is adjacent to said larger diameter portion of said second end portion of said stub shaft.

20. The vehicle connect and disconnect system of claim 15, further comprising a third bushing and a fourth bushing;
  wherein said third bushing has a first end, a second end; an inner surface and an outer surface;
    wherein said third bushing is disposed between said inner surface of said lead screw and said outer surface of said stub shaft;
    wherein said first end of said third bushing is adjacent to said second end of said first spring and said second end of said third bushing is adjacent to said first end of said sliding collar and said first side of said lead screw collar;
  wherein said fourth bushing has a first end, a second end, an inner surface and an outer surface;
    wherein fourth bushing is disposed between said inner surface of said lead screw and said outer surface of said stub shaft;
    wherein said first end of said fourth bushing is adjacent to said second end of said sliding collar and said second side of said lead screw collar; and
    wherein said second end of said fourth bushing is adjacent to said first end of said second spring.

21. The vehicle connect and disconnect system of claim 15, further comprising at least one retention washer having a first end, a second end, an inner surface and an outer surface; and
  wherein said at least one retention washer is disposed between said second end of said first bushing and said first end of said first spring.

22. The vehicle connect and disconnect system of claim 15, further comprising a third shaft having a first end portion and a second end portion;
  wherein said second shaft further comprises an inner surface and an outer surface defining a hollow portion therein;
  wherein at least a portion of said first end portion of said third shaft extends into said hollow portion of said second shaft; and
  wherein said outer surface of said third shaft is connected to said inner surface of said second shaft.

23. The vehicle connect and disconnect system of claim 15, wherein said housing further comprises an opening;
  wherein said opening extends from said outer surface of said housing to said inner surface of said housing; and
  wherein said ring gear is disposed radially inward from said opening in said housing.

24. The vehicle connect and disconnect system of claim 15, wherein said groove is rectangular in shape.

* * * * *